United States Patent
Pye et al.

(10) Patent No.: US 11,585,163 B2
(45) Date of Patent: Feb. 21, 2023

(54) CONNECTING TUBULARS IN A WELLBORE

(71) Applicant: Saudi Arabian Oil Company, Dhahran (SA)

(72) Inventors: Richard Mark Pye, Aberdeen (GB); Rae Andrew Younger, Aberdeenshire (GB); Rafael Adolfo Lastra Melo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/342,302

(22) Filed: Jun. 8, 2021

(65) Prior Publication Data

US 2022/0389773 A1    Dec. 8, 2022

(51) Int. Cl.
  *E21B 17/06*  (2006.01)
  *E21B 17/046*  (2006.01)
  *E21B 41/00*  (2006.01)

(52) U.S. Cl.
  CPC .......... *E21B 17/06* (2013.01); *E21B 17/0465* (2020.05); *E21B 41/0021* (2013.01)

(58) Field of Classification Search
  CPC ... E21B 17/06; E21B 17/0465; E21B 41/0021
  See application file for complete search history.

(56) References Cited

U.S. PATENT DOCUMENTS

| | | |
|---|---|---|
| 875,263 A | 12/1907 | Hertwig |
| 1,084,850 A * | 1/1914 | Ford ........................ F16B 5/02  411/338 |
| 2,030,169 A * | 2/1936 | Huck .................. F16B 19/1054  29/523 |
| 2,763,314 A | 9/1956 | Gill |
| 3,071,399 A | 1/1963 | Cronin |
| 3,193,921 A * | 7/1965 | Kahn ........................ F16B 5/04  29/523 |
| 4,044,591 A * | 8/1977 | Powderley ............. B21J 15/045  72/370.07 |

(Continued)

FOREIGN PATENT DOCUMENTS

JP    4474086    6/2010

OTHER PUBLICATIONS

PCT International Search Report and Written Opinion in International Appln. No. PCT/US2022/072823, dated Oct. 5, 2022, 14 pages.

*Primary Examiner* — Jonathan Malikasim
(74) *Attorney, Agent, or Firm* — Fish & Richardson P.C.

(57) ABSTRACT

A self-retaining shear pin tool and methods for connecting downhole tubulars in a wellbore are disclosed. The self-retaining shear pin tool includes a cap having an inner side and an outer side opposite the inner side, the cap defining a first recess formed in the inner side of the cap, the first recess of the cap having a cylindrical portion and a frustoconical portion extending from the cylindrical portion towards the outer side of the cap, and a shear pin disposed partially in the first recess of the cap and extending out of the first recess of the cap. The shear pin includes a body, a first recess extending inward from a first end of the body, a second recess extending inward from a second end of the body, a first swage, and a second swage die.

18 Claims, 7 Drawing Sheets

(56) References Cited

U.S. PATENT DOCUMENTS

| | | | | |
|---|---|---|---|---|
| 4,054,045 A | * | 10/1977 | King, Jr. | F16B 19/05 |
| | | | | 72/46 |
| 4,198,895 A | | 4/1980 | Ruhl | |
| 4,263,834 A | * | 4/1981 | Dudash | F16B 19/1027 |
| | | | | 411/44 |
| 4,582,349 A | * | 4/1986 | Chenoweth | E21B 33/1212 |
| | | | | 285/332.3 |
| 6,233,802 B1 | * | 5/2001 | Fulbright | F16B 19/05 |
| | | | | 29/243.519 |
| 6,287,079 B1 | * | 9/2001 | Gosling | F01D 5/066 |
| | | | | 416/248 |
| 6,665,922 B2 | * | 12/2003 | Schultz | B21J 15/022 |
| | | | | 411/361 |
| 6,719,510 B2 | * | 4/2004 | Cobzaru | F16B 19/05 |
| | | | | 411/335 |
| 7,025,550 B2 | * | 4/2006 | Monserratt | F16B 19/05 |
| | | | | 411/308 |
| 7,195,438 B2 | * | 3/2007 | Harbin | B21J 15/022 |
| | | | | 470/10 |
| 7,251,865 B2 | * | 8/2007 | Takamura | A44B 1/34 |
| | | | | 24/691 |
| 7,275,903 B2 | * | 10/2007 | Schultz | F16B 23/0053 |
| | | | | 411/395 |
| 7,891,903 B2 | | 2/2011 | Klingenberg et al. | |
| 8,851,417 B2 | | 10/2014 | Sandy | |
| 9,829,029 B2 | * | 11/2017 | Sandy | B64D 27/26 |
| 11,332,997 B2 | * | 5/2022 | Hitchcock | E21B 33/13 |
| 11,466,519 B2 | * | 10/2022 | Cosse | E21B 17/06 |
| 2011/0058916 A1 | | 3/2011 | Toosky | |
| 2014/0251593 A1 | | 9/2014 | Oberg et al. | |

\* cited by examiner

CONNECTING TUBULARS IN A WELLBORE

TECHNICAL FIELD

The present disclosure generally relates to shear pin tools and methods, more particularly self-retaining shear pin tools and methods, for connecting downhole tubulars in a wellbore.

BACKGROUND

Drilling, operating, and maintaining wells includes placing downhole tubulars within wellbores. Shear pins (e.g., shear pins or shear screws with partially threaded shanks) can be employed to connect downhole tubulars in the wellbore. Shear pins can serve as a "weak-link" in the connected downhole tubulars. Application of an increased axial load that exceeds a predefined threshold on the shear pins causes the pins to fail and the downhole tubulars to separate and move freely.

SUMMARY

This specification describes self-retaining shear pin tools and methods to connect downhole tubulars in a wellbore. During operation, under high axial loading, the separated parts of the shear pin tool are retained which prevents them from falling into downhole equipment causing equipment malfunction.

These tools and methods provide an approach which allows separation of downhole tubulars and retention of portions of the self-retaining shear pin tool after shearing takes place. The tools can include a cap and a shear pin. The shear pin can include a body, and one or two swage dies. The self-retaining shear pin tool can be installed into an aperture with a recess of a tubular and a force is applied to the tool. Upon application of the force, the swage die causes the body portion of the shear pin to expand and to change dimension. The dimensional change of the body locks the shear pin into the aperture of the tubular so it is no longer free to move.

In some aspects, a self-retaining shear pin tool for connecting downhole tubulars in a wellbore includes a cap having an inner side and an outer side opposite the inner side, the cap defining a first recess formed in the inner side of the cap, the first recess of the cap having a cylindrical portion and a frustoconical portion extending from the cylindrical portion towards the outer side of the cap; and a shear pin disposed partially in the first recess of the cap and extending out of the first recess of the cap. The shear pin includes a body; a first recess extending inward from a first end of the body, the first recess having a cylindrical portion and a frustoconical portion between the cylindrical portion and the first end of the body; a second recess extending inward from a second end of the body, the second recess having a cylindrical portion and a frustoconical portion between the cylindrical portion of the second recess and the second end of the body; a first swage die disposed in the first recess of the body; and a second swage die disposed in the second recess of the body.

In some aspects, the self-retaining shear pin tool includes a cap having an inner side and an outer side opposite the inner side; and a shear pin extending from the inner side of the cap. The shear pin includes a body defining a first recess with a cylindrical portion and a frustoconical portion between the cylindrical portion and an end of the shear pin; and a swage die disposed in the first recess of the body.

Embodiments of the self-retaining shear pin tool for connecting downhole tubulars in a wellbore can include one or more of the following features.

In some embodiments, the body of the shear pin is a thread-less body.

In some embodiments, the body of the shear pin defines a channel extending between the first recess and the second recess of the shear pin.

In some embodiments, the first recess has diameter between 0.004 mm and 0.504 mm.

In some embodiments, the swage die includes a length between 0.064 mm and 0.444 mm, and an outer diameter between 0.054 mm and 0.454 mm.

In some embodiments, the body of the shear pin is a cylindrical body.

In some embodiments, the shear pin and the cap are attached by a press-fit.

In some embodiments, the shear pin includes materials with coefficients of thermal expansion that can achieve a self-tightening assembly when heated.

In some embodiments, the swage die has a transition or an interface fit with the body of the shear pin.

In some embodiments, the cap of the shear pin defines a second recess formed on the outer side of the cap. In some cases, the second recess comprises a hex recess.

In some embodiments, the cap defines a first recess formed in the inner side of the cap, the first recess of the cap having a cylindrical portion and a frustoconical portion extending from the cylindrical portion towards an outer side of the cap. In some cases, the shear pin is disposed partially in the first recess of the cap and extending out of the first recess of the cap.

In some embodiments, the body of the shear pin defines a channel extending from the recess of the body to the end of the shear pin.

In some aspects, a method for connecting downhole tubulars in a wellbore includes aligning an aperture defined extending through a first tubular with a recess defined in an outer surface of a second tubular; installing a self-retaining shear pin tool through the aperture of the first tubular into the recess of the second tubular, the self-retaining shear pin tool includes a cap and a shear pin; and applying an axial load to the self-retaining shear pin tool, the axial load exceeds the yield strength of the shear pin of the self-retaining shear pin tool to change dimension and shape of the shear pin of the self-retaining shear pin tool. The changed dimension and shape lock the self-retaining shear pin tool in the aperture of the first tubular and the recess of the second tubular attaches the first tubular and the second tubular.

Embodiments of the method for connecting downhole tubulars in a wellbore can include one or more of the following features.

In some embodiments, the method includes preventing pressure changes from exerting forces on the self-retaining shear pin tool by using a channel formed in the shear pin.

In some embodiments, the method includes forcing a swage die into a body of the shear pin and loading the shear pin to failure. In some cases, the method includes disconnecting the first tubular and the second tubular by applying an axial load that exceeds the mechanical capacity of the body of the shear pin. In some cases, the method includes forcing a swage die into a threadless body of the shear pin.

The retained portions of the shear pin cannot exit the aperture of the downhole tubular and fall or move freely within the wellbore. This limits challenges during operation such as debris entering downhole equipment that can cause equipment malfunction. The self-retaining shear pin reduces or eliminates the need for encapsulation of the tool or addition of retention mechanism to prevent parts of the shear pin tool from falling out of the component during operation.

Some other approaches retaining the parts of the shear pin tool include adding threads to a portion of the shear pin shank, installing a retention feature behind the shear pin (e.g., threaded cap, circlip, dowel pin, peened edge), gluing a portion of the shear pin in place, and an interface or press-fit to a portion of the shear pin. However, these approaches add design complexity, additional operation steps, and increased cost of parts inventory and assembly. In contrast, the described self-retaining shear pin tool includes a threadless body that reduces design complexity and the requirement for the components to match during manufacturing. The threadless body design can eliminate the need for high precision manufacturing of multiple parts where all threads need to accurately engage. The self-retaining shear pin tool can be installed in a single operation and all parts are retained. It does not require access for side pins or extra parts to be installed. The dimensional change is repeatable and can give a designer confidence that the mechanical properties (e.g., pull-out force, depth, or volume of engagement) are consistent.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This specification describes self-retaining shear pin tools and methods to connect downhole tubulars in a wellbore. During operation, under high axial loading, the separated parts of the shear pin tool are retained which prevents them from falling into a downhole equipment causing equipment malfunction. These tools and methods provide an approach which allows separation of downhole tubulars and retention of the portions of the self-retaining shear pin tool after shearing takes place. The tools can include a cap and a shear pin. The shear pin can include a body, and one or two swage dies. The self-retaining shear pin tool can be installed into an aperture with a recess of a tubular and a force is applied to the tool. Upon application of the force, the swage die causes the body portion of the shear pin to expand and to change dimension. The dimensional change of the body locks the shear pin into the aperture of the tubular so it is no longer free to move.

Figure 1:
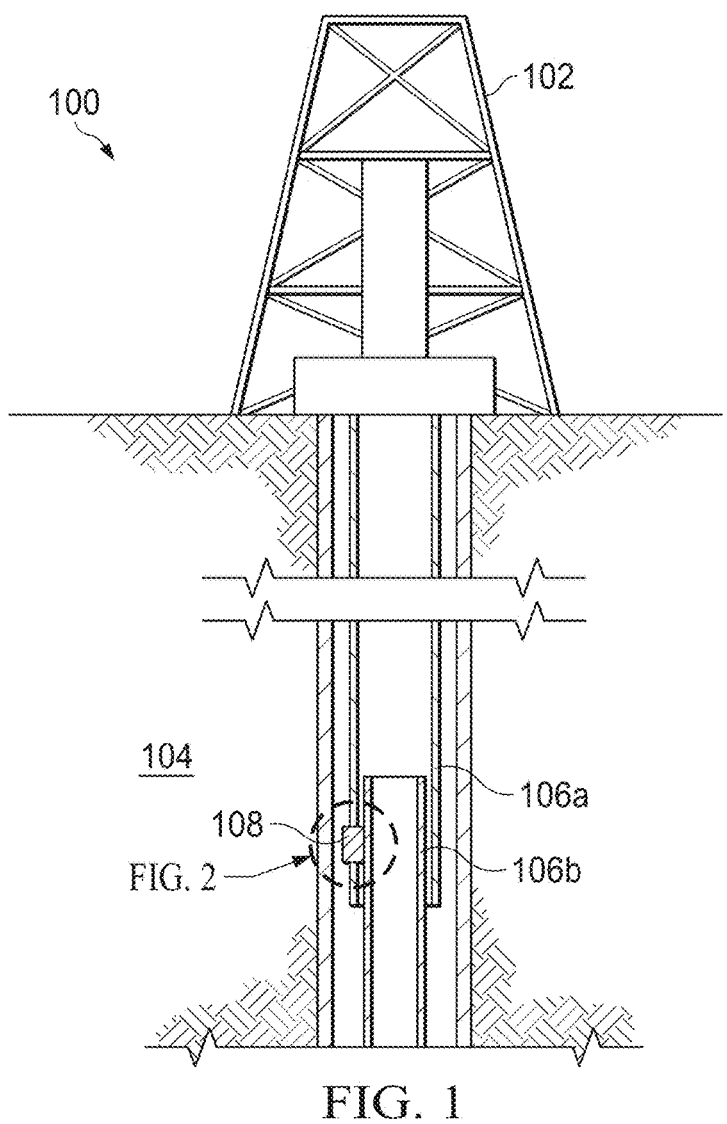
FIG. 1 is a schematic view of a wellsite that includes a self-retaining shear pin tool installed connecting two downhole tubulars.

FIG. 1 is a schematic view of a wellsite 100 that includes a self-retaining shear pin tool 108 installed connecting two downhole tubulars 106a and 106b. As illustrated, the wellsite 100 includes a derrick 102 that supports downhole tubulars 106a and 106b within a wellbore 104. The self-retaining shear pin tool 108 is configured as a single homogeneous component to connect the downhole tubulars 106a and 106b within the wellbore 104. A single self-retaining shear pin tool 108 is shown for clarity, but multiple self-retaining shear pin tools may be installed. In this example, the self-retaining shear pin tool 108 includes two or more separate components. The design of the self-retaining shear pin tool 108 helps retain components of the tool upon axial loading to separate the tubulars and to prevent equipment malfunction during operation.

Figure 2:
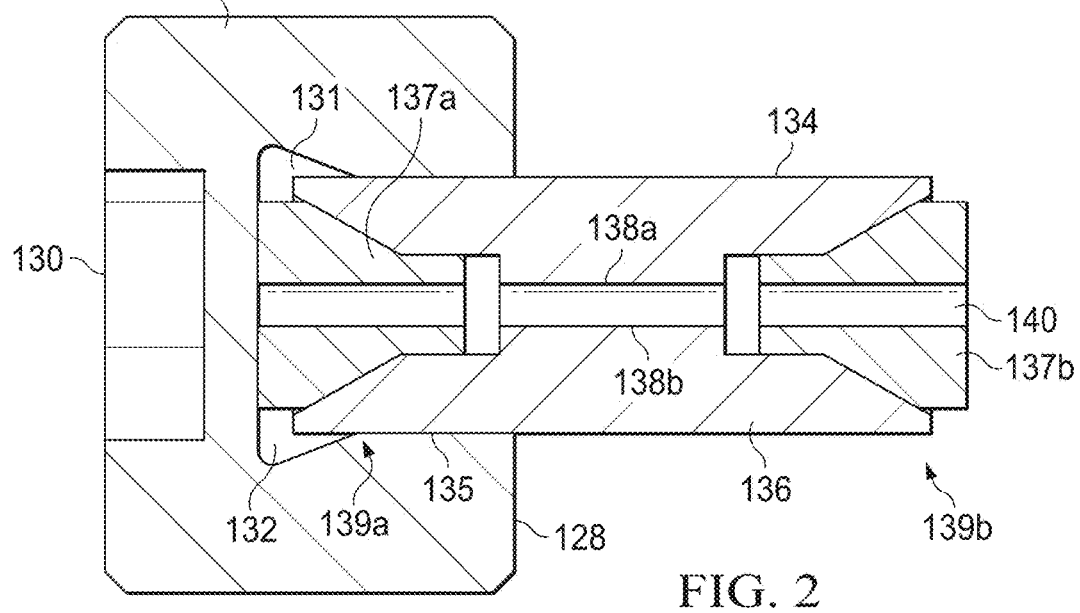
FIG. 2 is a cross-section of the self-retaining shear pin tool.

FIG. 2 is a cross-section of the self-retaining shear pin tool 108. The tool 108 includes a cap 128 and a shear pin 134. In some implementations, the cap 128 has an outer diameter between 0.496 millimeter (mm) and 1.004 mm, an inner diameter between 0.004 mm and 0.504 mm, and a thickness between 0.365 mm and 0.375 mm. In some implementations, the shear pin 134 has a cross-section between 4.238 mm and 5.762 mm based on the available space, shear load requirements, and the material. The length of the shear pin 134 is based on the radial space available within the tool or assembly. The cap 128 has an inner side 131 and an outer side 133 opposite of the inner side 131. The cap 128 defines a first recess 132 defined by the inner side 131 of the cap 128. The recess 132 of the cap 128 has a cylindrical portion 135 and a frustoconical portion 132 extending from the cylindrical portion 135 towards the outer side 133 of the cap 128. The frustoconical portion 132 extends into the cross-sectional area of the tool 108 defined transverse to the axis of the first recess 132. In this example, the cap 128 includes a second recess 130 (e.g., a hex recess, a slot, or a keyway) for a tool (e.g., Allen key) to be used during installation.

The shear pin 134 is disposed partially in the first recess 132 and extends out of the first recess 132 of the cap 128. In this implementation, the shear pin 134 includes a body 136 that is threadless and two swage dies 137a, 137b. The body 136 is cylindrical. The body 136 defines a first recess 138a with a cylindrical portion and a frustoconical portion between the cylindrical portion of the first recess 138a and a first end 139a of the shear pin 134. The body 136 also defines a second recess 138b with a cylindrical portion and a frustoconical portion between the cylindrical portion of the second recess 138b and a second end 139b of the shear pin 134.

The body 136 also defines a channel 140 extending between the first recess 138a and the second recess 138b of the shear pin 134. The presence of the channel 140 can prevent pressure changes from exerting forces on the tool 108 that can act upon the swage dies 137a, 137b. In this example, the channel 140 is a single axial thru-hole or a bypass method that can equalize the pressure between the cavity within the body 136 and the environment. The channel can include a radial hole, multiple holes, grooves, or combinations thereof. The first swage die 137a is disposed in the first recess 138a of the body 136. The second swage die 137b is disposed in the second recess 138b of the body 136. In other examples, the shear pin 134 can include only one swage die at one end of the body 136. For example, in some embodiments, the cap 128 and the shear pin 134 are a single unitary component. The swage dies 137a, 137b have profiles that engage with the body 136. The swage dies 137a, 137b can include the same or different material than the cap 128 and the body 136 of the shear pin 134. The materials can include materials with coefficients of thermal expansion properties that will enable tightening of the shear pin 134 in hot environments. For example, brass has a thermal expansion coefficient between 18 and $19 \times 10^{-6}$ m/m ° C. and carbon steel has a thermal expansion coefficient between 10.8 and 12.5×10$^{-6}$ m/m ° C. The higher thermal expansion coefficient in brass allows clearances to tighten together when inserted. In some implementations, the swage die 137 can include a transition or interference fit with the body 136 such that the swage die 137 is retained when initially assembled. This allows a fully assembled tool to be stored as a single unit within a workshop or a storage environment. This design can retain the swage die during routine handling and storage while allowing the swage die to move during operation. In other shear pin tools, a light strength adhesive (e.g., loctite) is used to achieve the same design.

During installation of the shear pin tool 108, the swage dies 137a, 137b are pressed into the first recess 138a and the second recess 138b of the body 136 of the shear pin 134, respectively. The swage dies 137a, 137b cause the body 136 to expand, change shape, exceed the yield point of the material, and permanently deform.

The geometry and the material of the shear pin 134 can enable a designer to adjust the failure threshold of the tool 108. For example, a body with an increased cross-section or a material that includes a high yield property can increase the load capacity that the shear pin tool 108 can withstand. This allows the shear pin tool assembly to withstand an increased loading before the separation of the tubulars takes place. In some implementations, the cap 128 and the shear pin 134 can include the same material. In this example, the cap 128 and the shear pin 134 include different material. For example, a shear pin 134 of the tool 108 can include soft materials (e.g., brass) and be press fitted or bonded with the cap 128. In some implementations, the body 136 can be designed to not shear (e.g., serve as a self-locking fastener). For example, to fit parts together without external thru-holes. This type of fastener could be used to fit car or aircraft panels which are forcibly pressed together and are aesthetically pleasing once installed. The fasteners, which are installed in blind holes then swage out, permanently attaching the panels or parts together. From the front there would be no visible fasteners. This can also be advantageous for vandal resistant or tamper resistant applications (e.g., once the parts are pressed together there is no externally exposed fastener). Similarly this could be used on enclosures and devices assembled on production lines since the parts can be easily pressed together to give a smooth exterior appearance without screw holes. Once fitted could only be opened again by destructive means.

Figure 3A:
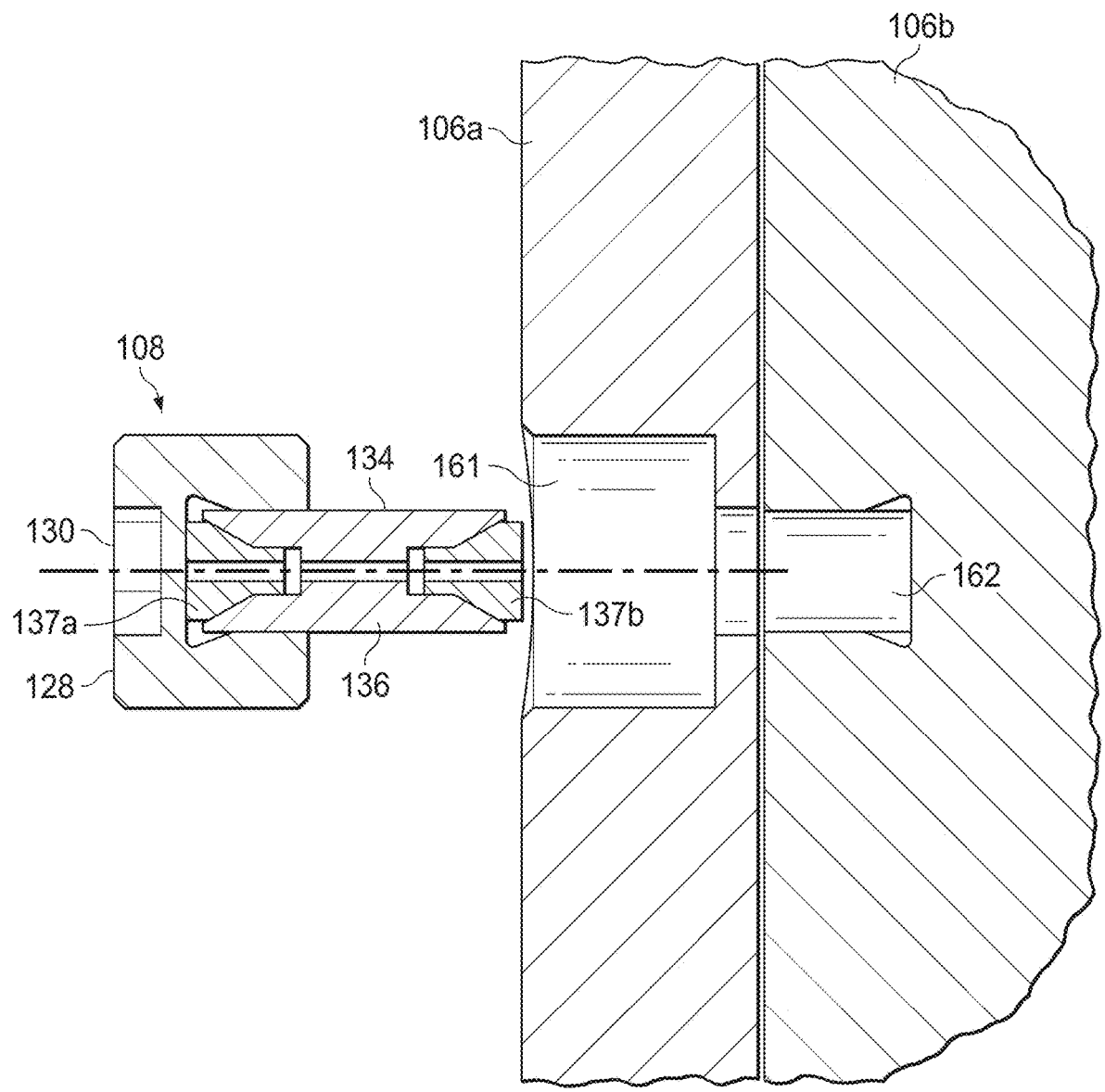
FIGS. 3A-3D illustrate the installation and use of the self-retaining shear pin tool.

FIGS. 3A-3D illustrate the installation and the use of the self-retaining shear pin tool 108. The self-retaining shear pin tool 108 is used to attach a first tubular 106a and a second tubular 106b together. In FIG. 3A, the installation includes placing the self-retaining shear pin tool 108 through an aperture 161 into the tubular 106a with a recess 162 formed in the second tubular 106b. The tubulars 106a, 106b are positioned with the aperture 161 in the tubular 106a aligned with the recess 162 in the tubular 106b.

Figure 3B:
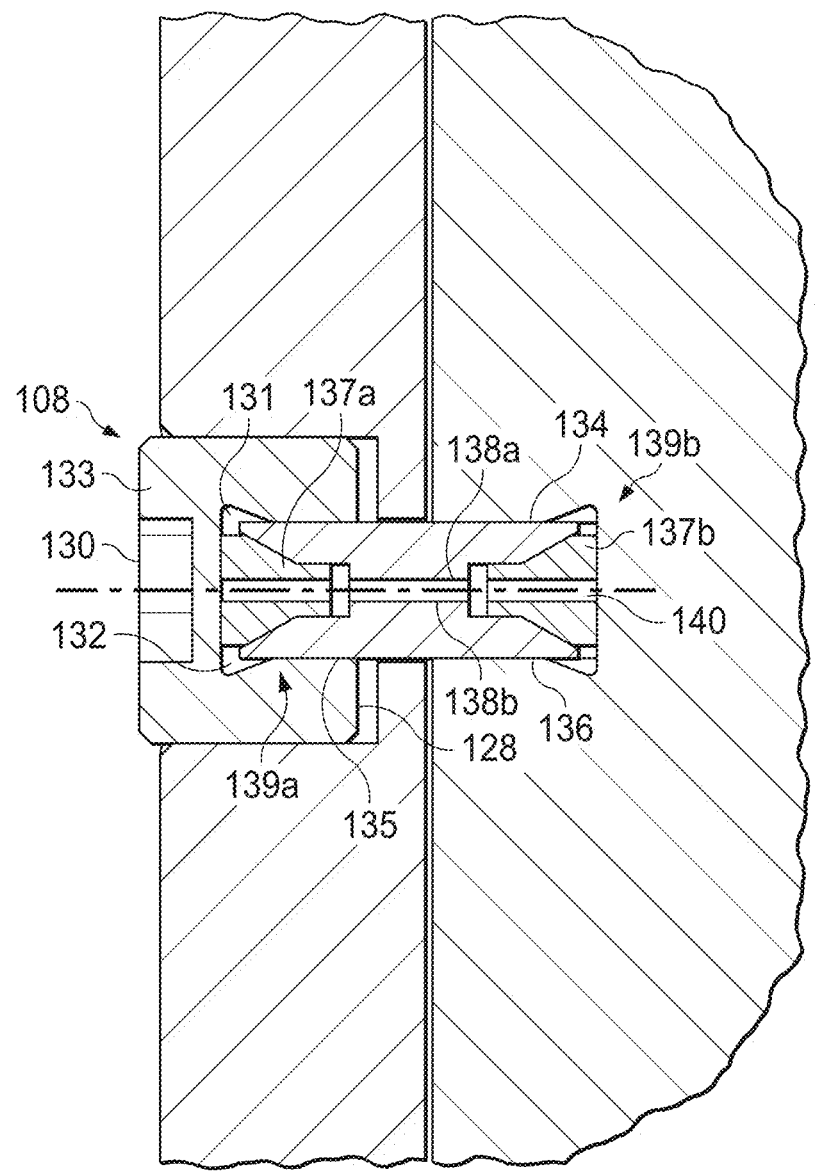
Figure 3C:
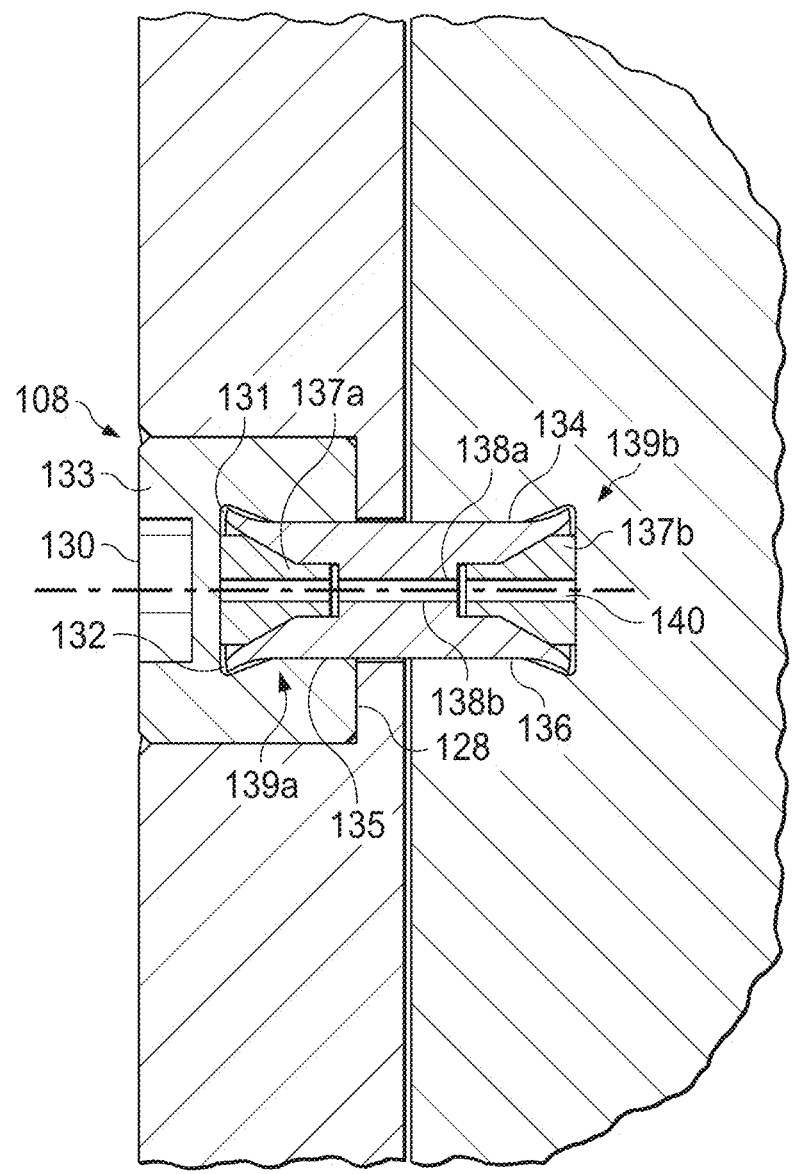

As illustrated, the recess 162 of the downhole tubular 106b has a dovetail shape. The internal dovetail shape can be machined with a standard tooling. In some implementations, the aperture can include a circumferential groove, a discrete pocket, a tee slot, a trapezoidal slot, an oval slot, and a recess profile into which the self-retaining shear pin tool 108 can dimensionally change. In FIG. 3B, an axial load is applied on the self-retaining shear pin tool 108 and the tool 108 is pressed in the first tubular 106a and the second tubular 106b. The tool 108 is in direct contact with the end of the recess 162. As illustrated, the cap 128 is not fully inserted yet and has space for more insertion (i.e., before contact between the cap 128 and the shoulder of the aperture 161). The swage dies 137a, 137b are in contact with the aperture 162 and the cap 128 but not pushed fully into the body 136 of the shear pin 134. In FIG. 3C, continuous load application on the tool 108 drives the swage dies 137a, 137b into the body 136 of the shear pin 134. This causes the axial load to exceed the yield load of the body 136 and the body 136 to change dimensionally. Dimensional changes of the body 136 provide the expanded ends. These ends lock the tool 108 into place so that it is unable to be withdrawn or fall out from the recess 162.

The dimensional changes of the shear pin 134 can also provide an interference fit between the cap 128 and the sides of the aperture 161 in the tubular 106a. The interference fit prevents the cap 128 from slackening or loosening. This allows the tool 108 to be resistant to forces that can loosen the cap 128 (e.g., torque, vibration, or tension) without relying on additional retention methods (e.g., threadlock, wire, pinned, or peening). In some implementations, the cap 128 can be partially loose as the expanded ends prevent the cap 128 from being fully removed while the shear pin 134 is not under loading. This provides ease of tool installation and reduces the cost of additional retention methods. The user installing the tool 108 can note the tight connection once the tool 108 is fully inserted into the aperture 162. It can be observed that the body 136, where shear takes place, is spaced apart from the swage dies 137a, 137b. The body 136 in shear can mimic a traditional shear pin. In some examples, the body shape can differ from the ends where the swage dies 137a, 137b act. This allows shape flexibility of the tool for a designer.

Figure 3D:
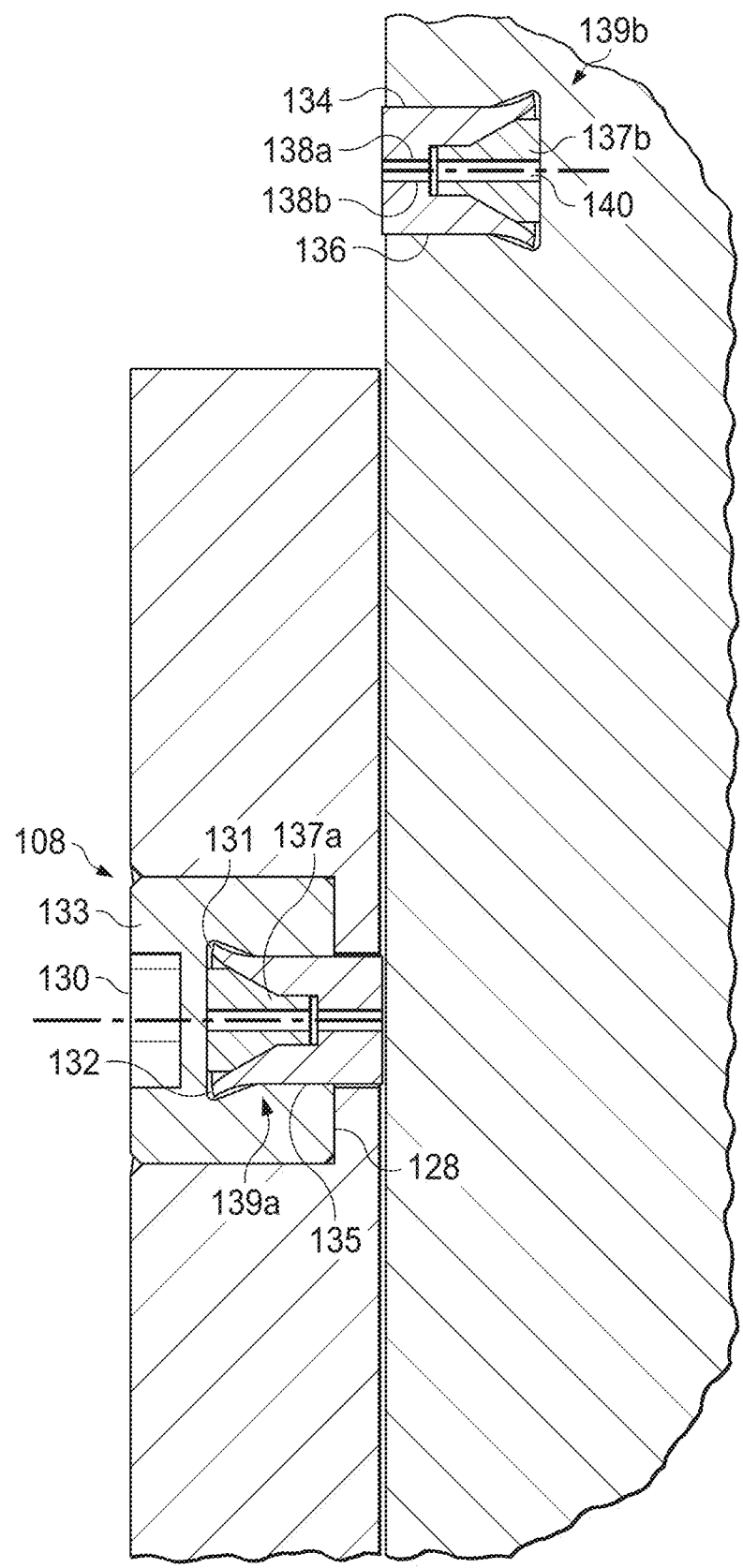

In FIG. 3D, the axial load is applied to the self-retaining shear pin tool 108 exceeding the threshold value of the tool and the tool 108 fails. This allows the downhole tubulars 106a, 106b to disconnect and slide apart. Separation of the tool 108 takes place when the stress through the body 136 of the shear pin 134 exceeds the mechanical capacity of the body 136. The cap 128 and part of the shear pin 134 are retained in the aperture 161 of the outer tubular 106a and part of the shear pin 134 is retained in the inner tubular 106b because the body 136 is dimensionally changed. The swage dies 137a, 137b are trapped in place and also retained. This prevents equipment malfunction during operation as the tool cannot fall in the downhole equipment.

The self-retaining shear pin tool can be assembled or operated in a variety of ways without departing from this disclosure. For example, the self-retaining shear pin tool can include blanking caps installed in place of the shear pin of the tool. This reuse of components reduces parts inventory and allows the number of pins installed in each tool to be adjusted based on the demand. In another example, the tool can include a threaded cap. The cap can be installed and retained by other installation approach. For example, an installation approach that can generate a clamping force on the pin and initiate dimensional changes in the body. The cap can be a press fit or interference fit and driven into place by a force. The act of driving the cap by force can force the swage dies into the body and the dimensional change of the body to lock the self-retaining tool in place. In another example, the cap and the shear pin can be installed in a separate operation during an assembly process.

The parts of the tool can be formed in variety of shapes that allow dimensional changes. For example, the body and the swage die can include serrations, raised bands, or combinations thereof. The geometry can prevent the swage die from being withdrawn once driven into place and the body from loosening. The imposed dimensional changes of the body can cause the body to mechanically lock into the serrations or similar features. This mechanical interference can provide more resistance to motion than friction. In another example, the outside surface of the body can be smooth, notched, include serrations, or bands to prevent the body from being withdrawn or moving within the aperture. In another example, the body can include pre-cut slots or geometric features to preferentially cause advantageous dimensional changes (e.g., longitudinal slots). In other example, the tool design can be planar and used as a flat snap connector. In some implementations, the aperture of the downhole tubulars can include circumferential bands, recess, cone, ribs, pocket, local dimple, conical protrusions, or geometric features that cause dimensional changes in the body.

Figure 4:
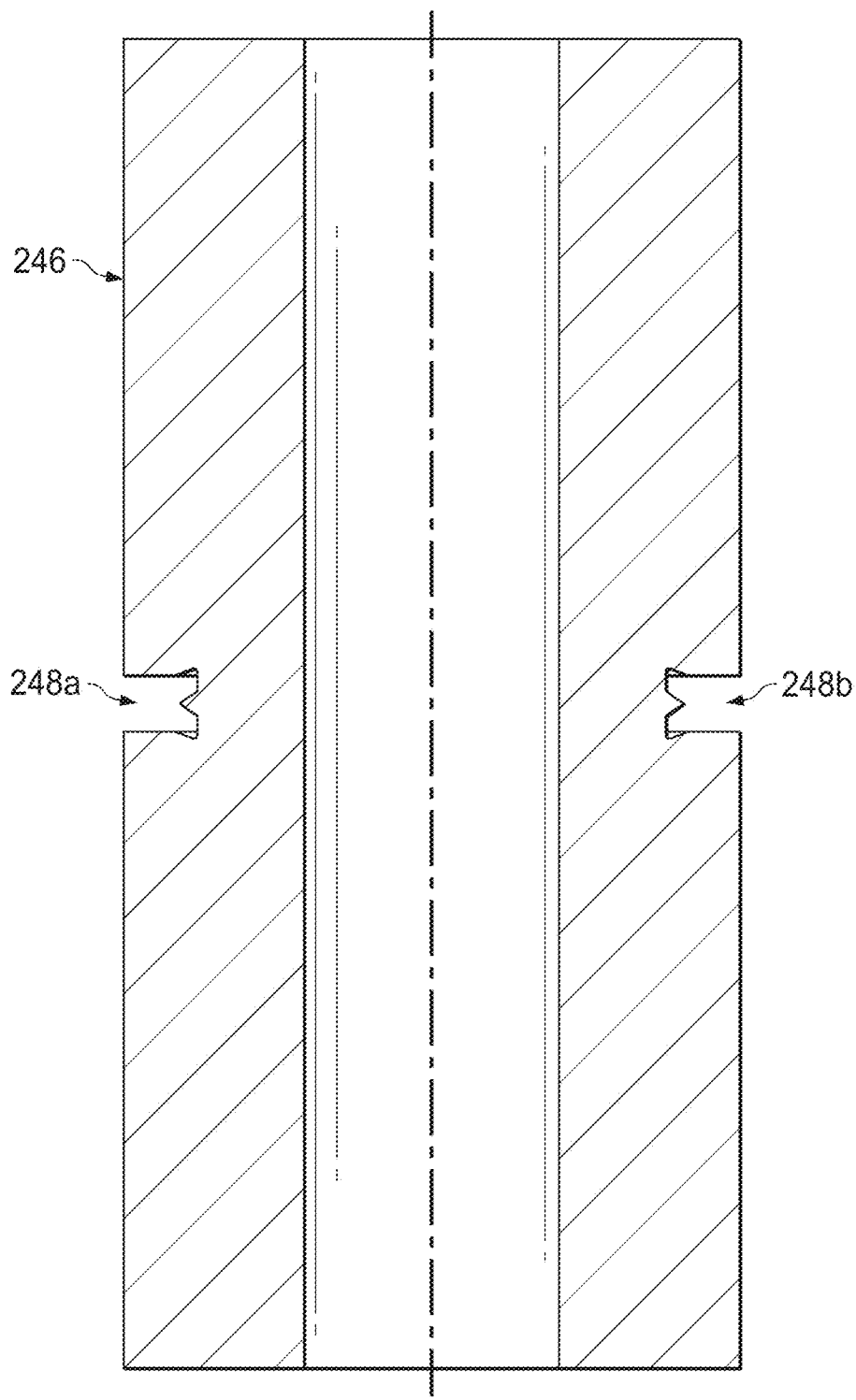
FIG. 4 is a cross-section of a downhole tubular with a raised vee design aperture.

FIG. 4 is a cross-section of a downhole tubular with a raised vee design aperture 246 on each side 248a, 248b. For installation, the self-retaining shear pin tool 108 can be forced into the raised vee apertures 248a, 248b and position the shear pin 134 at an angle to engage with the aperture. The tool 108 and the aperture 162 can include variety of designs that enable mechanical deformation of the shear pin 134 of the tool 108. For example, if the recess or groove includes geometry to flare or otherwise expand the shear pin, the pin itself will not require the swage die since the geometry will expand the shear pin end. This makes the shear pin potentially less complex and economical to manufacture with fewer parts.

Figure 5:
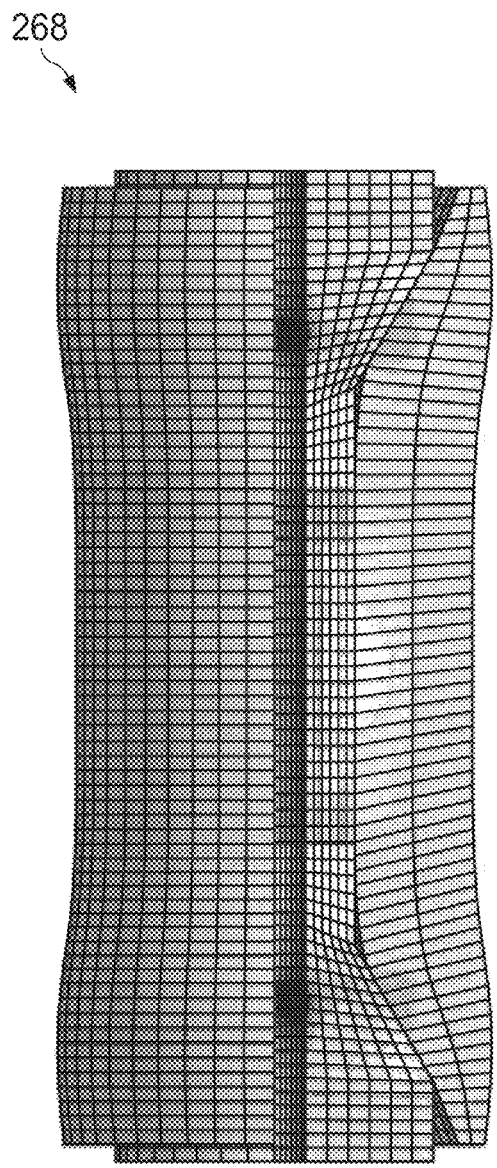
FIG. 5 is a model grid showing deformation of the self-retaining shear pin tool under axial load.

FIG. 5 is a model grid showing deformation 268 of the self-retaining shear pin tool 108 under axial load. A design of the self-retaining shear pin tool 108 was modelled using finite element simulation software (CDESP Quick Connect) to analyze tool deformation under loading. Initial contours of stress distribution along the simulated design of the tool 268 confirm that the body 136 of the tool 108 can be mechanically deformed under load. The load is imposed by the swage dies 137a, 137b. [We will keep as shows good results of the pin.]

The described tool can also be used in mass-manufacturing of parts that are permanently attached (e.g., car panels, aerospace assembly, or construction platforms). The described tool provides the rigid attachment without a use of traditional screw fasteners. Rather, the parts can be pressed together and achieve a permanent attachment. The tool can be applicable in assemblies where a fastener is positioned behind an inaccessible object. This type of fastener can be used where an object needs to be attached but the entry to the rear of the object is not accessible. The object can be pressed into place from the accessible side and the self-retaining shear pin tool will stay retained. The design is scalable and can be used for applications in small and large equipment. For example, it can be used in MEMS and micro devices. All components of the assembly are in direct contact and can be electrically conductive to provide mechanical connections in electrical equipment. For example, the tool can allow large diameter high current bus bar connections that are press fit for application in power generation, offshore and wind turbines, industrial machinery, and power distribution. The tool can be used as a mechanical puller if threads are added to the design. The design can be used as a removal tool and the previously connected components can be redressed and reused. It would also allow the sheared portion of the tool to be forcibly withdrawn from the cap and the cap to be refurbished and/or reused.

While this specification contains many specific implementation details, these should not be construed as limitations on the scope of what may be claimed, but rather as descriptions of features that may be specific to particular implementations. Certain features that are described in this specification in the context of separate implementations can be implemented, in combination, in a single implementation. Conversely, various features that are described in the context of a single implementation can be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A self-retaining shear pin tool for connecting downhole tubulars in a wellbore, the self-retaining shear pin tool comprising:
    a cap having an inner side and an outer side opposite the inner side, the cap defining a first recess formed in the inner side of the cap, the first recess of the cap having a cylindrical portion and a frustoconical portion extending from the cylindrical portion towards the outer side of the cap; and
    a shear pin disposed partially in the first recess of the cap and extending out of the first recess of the cap, the shear pin comprising:
        a body;
        a first recess extending inward from a first end of the body, the first recess having a cylindrical portion and a frustoconical portion between the cylindrical portion and the first end of the body;
        a second recess extending inward from a second end of the body, the second recess having a cylindrical portion and a frustoconical portion between the cylindrical portion of the second recess and the second end of the body;
        a first swage die disposed in the first recess of the body; and
        a second swage die disposed in the second recess of the body.

2. The tool of claim 1, wherein the body of the shear pin is a thread-less body.

3. The tool of claim 1, wherein the body of the shear pin defines a channel extending between the first recess and the second recess of the shear pin.

4. The tool of claim 1, wherein the first recess has a diameter between 0.004 millimeters and 0.504 millimeters.

5. The tool of claim 1, wherein the first swage die and the second swage die include a length between 0.064 millimeters and 0.444 millimeters, and an outer diameter between 0.054 millimeters and 0.454 millimeters.

6. The tool of claim 1, wherein the body of the shear pin is a cylindrical body.

7. The tool of claim 1, wherein the shear pin and the cap are attached by a press-fit.

8. The tool of claim 1, wherein the shear pin includes materials with coefficients of thermal expansion that can achieve a self-tightening assembly when heated.

9. The tool of claim 1, wherein at least one of the first swage die or the second swage die has a transition or an interface fit with the body of the shear pin.

10. The tool of claim 1, wherein the cap of the shear pin defines a second recess formed on the outer side of the cap.

11. The tool of claim 10, wherein the second recess comprises a hex recess.

12. A self-retaining shear pin tool comprising:
   a cap having an inner side and an outer side opposite the inner side, wherein the cap defines a first recess formed in the inner side of the cap, the first recess of the cap having a cylindrical portion and a frustoconical portion extending from the cylindrical portion towards an outer side of the cap; and
   a shear pin extending from the inner side of the cap, the shear pin comprising:
      a body defining a first recess with a cylindrical portion and a frustoconical portion between the cylindrical portion and an end of the shear pin; and
      a swage die disposed in the first recess of the body.

13. The tool of claim 12, wherein the shear pin is disposed partially in the first recess of the cap and extending out of the first recess of the cap.

14. The tool of claim 12, wherein the body of the shear pin defines a channel extending from the first recess of the body to the end of the shear pin.

15. A method for connecting downhole tubulars in a wellbore, the method comprising:
   aligning an aperture defined extending through a first tubular with a recess defined in an outer surface of a second tubular;
   installing a self-retaining shear pin tool through the aperture of the first tubular into the recess of the second tubular, the self-retaining shear pin tool comprises a cap and a shear pin; and
   applying an axial load to the self-retaining shear pin tool, the axial load exceeds a yield strength of the shear pin of the self-retaining shear pin tool to change a dimension and a shape of the shear pin of the self-retaining shear pin tool, wherein the changed dimension and shape lock the self-retaining shear pin tool in the aperture of the first tubular and the recess of the second tubular, wherein changing the dimension and the shape of the shear pin comprises forcing a swage die into a body of the shear pin and loading the shear pin to failure; and
   attaching the first tubular to the second tubular.

16. The method of claim 15, further comprising preventing pressure changes from exerting forces on the self-retaining shear pin tool by using a channel formed in the shear pin.

17. The method of claim 15, further comprising disconnecting the first tubular and the second tubular by applying an axial load that exceeds a mechanical capacity of the body of the shear pin.

18. The method of claim 15, further comprising forcing the swage die into a threadless body of the shear pin.

* * * * *